(12) United States Patent
Hinds et al.

(10) Patent No.: US 8,154,887 B2
(45) Date of Patent: Apr. 10, 2012

(54) DUAL ISOLATED INPUT SINGLE POWER SUPPLY TOPOLOGY

(75) Inventors: Andy Hinds, Marana, AZ (US); Marian Gregg, Oro Valley, AZ (US); Mark Baril, Tucson, AZ (US)

(73) Assignee: Honeywell International Inc., Morristown, NJ (US)

( * ) Notice: Subject to any disclaimer, the term of this patent is extended or adjusted under 35 U.S.C. 154(b) by 606 days.

(21) Appl. No.: 12/248,585

(22) Filed: Oct. 9, 2008

(65) Prior Publication Data
US 2010/0091521 A1    Apr. 15, 2010

(51) Int. Cl.
*H02M 3/00*    (2006.01)
(52) U.S. Cl. .......................................... 363/15
(58) Field of Classification Search ............... 363/15, 363/17, 49, 56.01, 72, 75, 89; 323/282, 285, 323/355
See application file for complete search history.

(56) References Cited

U.S. PATENT DOCUMENTS

| | | | | |
|---|---|---|---|---|
| 4,055,791 A * | 10/1977 | Bland et al. | ...................... | 363/28 |
| 4,628,426 A * | 12/1986 | Steigerwald | ..................... | 363/17 |
| 5,262,933 A * | 11/1993 | Shyi-Hon | ........................ | 363/49 |
| 6,381,284 B1 | 4/2002 | Strizhevskiy | | |
| 7,532,494 B2 * | 5/2009 | Louvel et al. | ................... | 363/89 |
| 7,701,736 B2 * | 4/2010 | Yang et al. | ...................... | 363/89 |
| 2005/0077886 A1 | 4/2005 | Cester | | |

* cited by examiner

*Primary Examiner* — Adolf Berhane
*Assistant Examiner* — Yemane Mehari
(74) *Attorney, Agent, or Firm* — Michael Shimokaji, Esq.

(57) ABSTRACT

An electric power supply system includes a transformer having two primary windings for receiving input power and a secondary winding for delivering output power, in which the primary windings are galvanically isolated from each other. A method for supplying electrical power to a load includes magnetically coupling a first primary voltage to a secondary power output; and magnetically coupling a second primary voltage to the secondary power output so that the second primary voltage is kept galvanically isolated from the first primary voltage.

16 Claims, 2 Drawing Sheets

DUAL ISOLATED INPUT SINGLE POWER SUPPLY TOPOLOGY

BACKGROUND OF THE INVENTION

The present invention generally relates to electrical power systems and, more particularly, to electrical power supplies for vehicles such as aircraft.

Electrical power supply systems for aircraft typically have a variety of redundancy requirements for the provision of electrical power for the aircraft's systems, which may include, for example, avionics, cabin environment, lights, and, with the advent of MEA (more electric architecture), flight controls and actuators. For example, it may be required to provide power from an emergency back up source in the event of a failure of a main power supply.

Some aircraft manufacturers have recently imposed a requirement for a secondary electrical power supply providing backup to a primary power supply to be galvanically isolated from the primary supply. Two power supplies can be galvanically isolated if, for example, they do not share a common ground, their power inputs are electrically isolated, and there is no mechanical connection between them. In addition, it may be required for two galvanically isolated power supplies on a circuit board to have some pre-specified physical separation distance or space between them.

As can be seen, there is a need for a power supply having a circuit topology that galvanically isolates the power inputs of the power supplies from one another.

SUMMARY OF THE INVENTION

In one aspect of the present invention, an electric power supply system includes a transformer having two primary windings for receiving input power and a secondary winding for delivering output power, and the primary windings are galvanically isolated from each other.

In another aspect of the present invention, an apparatus for supplying electrical power includes a transformer having at least two primary windings and a secondary winding, a first primary winding being connected to a first DC voltage, and a second primary winding being connected to a second DC voltage; a first pulse width modulator that controls current through the first primary winding; a second pulse width modulator that controls current through the second primary winding, and galvanic isolation is maintained between the first DC voltage and the second DC voltage.

In still another aspect of the present invention, a method for supplying electrical power to a load includes magnetically coupling a first primary voltage to a secondary power output; and magnetically coupling a second primary voltage to the secondary power output so that the second primary voltage is kept galvanically isolated from the first primary voltage.

These and other features, aspects and advantages of the present invention will become better understood with reference to the following drawings, description and claims.

DETAILED DESCRIPTION OF THE INVENTION

Figure 1:
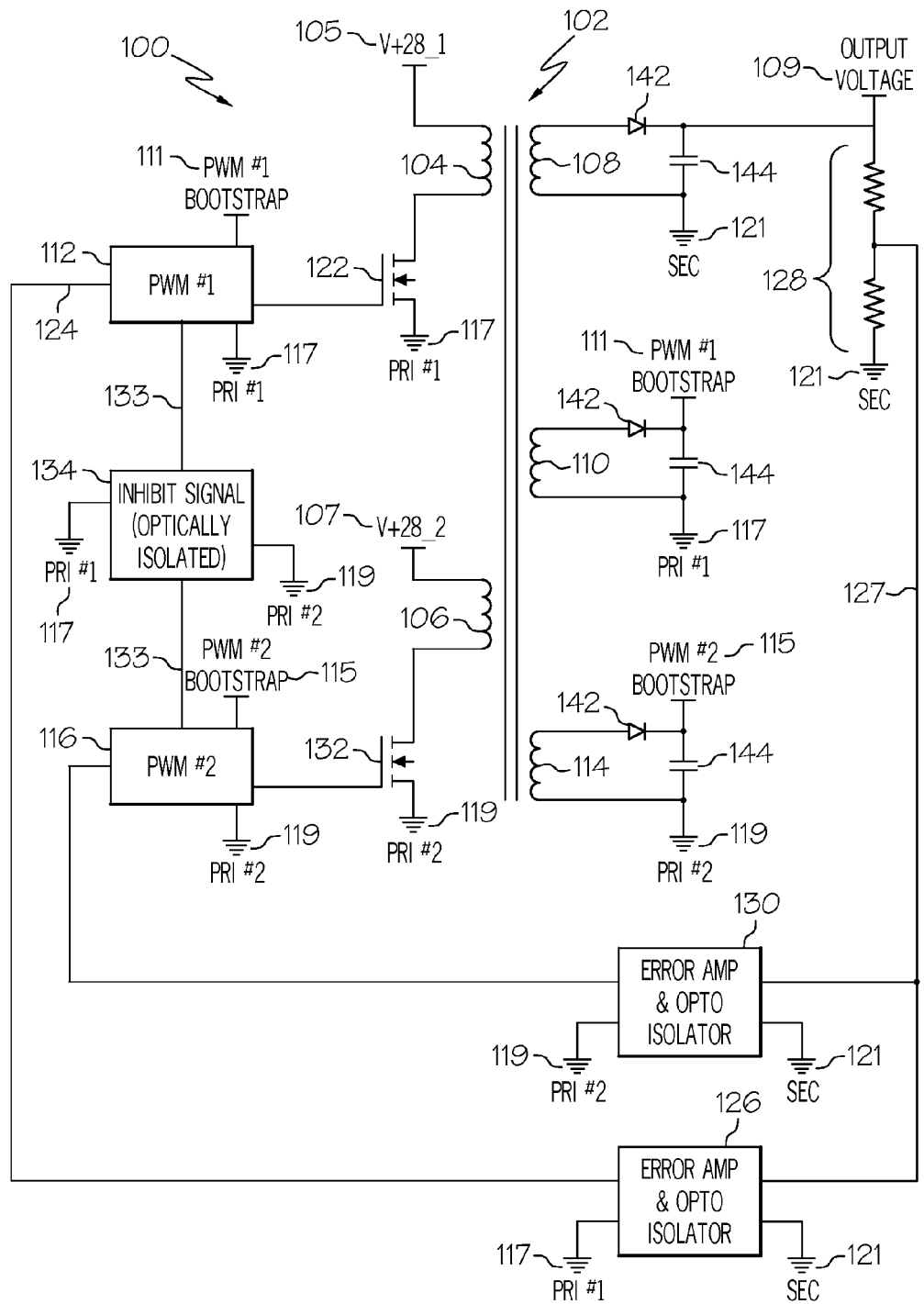
FIG. 1 is a circuit diagram showing a circuit topology for isolating the power inputs for a multiple input power supply in accordance with one embodiment of the present invention.

The following detailed description is of the best currently contemplated modes of carrying out the invention. The description is not to be taken in a limiting sense, but is made merely for the purpose of illustrating the general principles of the invention, since the scope of the invention is best defined by the appended claims.

Various inventive features are described below that can each be used independently of one another or in combination with other features. However, any single inventive feature may not address any of the problems discussed above or may only address one of the problems discussed above. Further, one or more of the problems discussed above may not be fully addressed by any of the features described below.

The present invention generally ensures galvanic isolation between inputs for a power supply or power supplies that are required to provide power to the same load from alternative power inputs—such as the main power bus and the emergency power bus of a commercial aircraft. Embodiments may be useful for any vehicle that uses multiple or redundant power supplies to provide alternative sources of power to the vehicle systems. For example, many commercial aircraft typically have a right and left side power bus and emergency power bus arranged so that power can be switched from one to another to provide backup power in the event of a failure—such as a short circuit—in one of the systems.

In the absence of a requirement for galvanic separation, power inputs to a power supply could be isolated from each other using diodes. For example, two diodes wired in parallel with the anode of a first diode connected to a first supply (input) voltage, the anode of the second diode connected to a second supply (input) voltage, and the cathodes of the two diodes connected, for example, to a primary winding of a transformer whose secondary winding supplies (output) power to a load could be used to provide electrical isolation between the two power supply inputs. In addition, such an arrangement automatically selects power from the input having the higher (or highest in the case of multiple inputs) voltage. Such an arrangement does not, however, provide galvanic isolation because the two power inputs remain connected to each other at the solid state level through the diodes. Embodiments of the present invention differ from such arrangements by providing galvanic (e.g., electrical, mechanical, and physical separation) isolation between the power supply input circuits. Embodiments also provide a master-slave arrangement in which power is preferentially used only from the "master" power supply input when available and usage is switched over the "slave" power supply input when needed, for example, when master input voltage falls below a pre-specified low voltage drop out (LVDO).

Embodiments of the present invention also differ from more straightforward approaches to providing galvanic isolation such as using switching relays to switch between the power inputs or using two or more completely separate power supplies. By not using relays, embodiments avoid mechanical and physical wear of moving parts and of the relay switching contacts, which may, for example, become carbonized or burned. By using a single power supply and transformer (rather than two separate power supplies), embodiments avoid excess weight and cost penalties of duplicate components, weight being especially critical for commercial aircraft. For example, an embodiment can reduce the complexity of using the higher input voltage between two separate supplies by using master-slave operation of the single supply, can reduce cost and circuit board area compared to two separate supplies, can reduce weight by using one transformer instead of two, can reduce filtering by using the same secondary power bus rather than two, and can reduce layout (design) effort by using a single layout rather than two.

FIG. 1 shows power supply system 100 in accordance with one embodiment. Power supply system 100 may include a transformer 102, which may have multiple primary windings. For example, as shown in FIG. 1, transformer 102 may have a first primary winding 104 and a second primary winding 106. All of the primary windings of transformer 102, in particular primary winding 104 together with primary winding 106, may be wound bifilar, e.g., the same winding layer and with the same number of turns. Primary winding 104 may be connected to a first source voltage 105, and secondary winding 106 may be connected to a second source voltage 107. Source voltages 105 and 107 may be required to be galvanically isolated from one another. For example, first source voltage 105 may be supplied from a main power bus of a commercial aircraft at 28 Volts (V) direct current (DC), indicated in FIG. 1 as V+28__1, and second source voltage 107 may be supplied from an emergency power bus of a commercial aircraft at 28 VDC, indicated in FIG. 1 as V+28__2, and the two aircraft power buses may be electrically, physically, and mechanically (i.e., galvanically) isolated from each other.

Transformer 102 may have a secondary winding 108, which may be magnetically coupled to primary winding 104 and to primary winding 106. Thus, power from either the first source voltage 105 or the second source voltage 107 may be transferred to secondary winding 108 to produce an output voltage 109, to which a load (not shown) may be connected and draw power from power supply system 100. Because the only couplings between the primary windings 104, 106 and secondary winding 108 are magnetic, galvanic isolation between the first source voltage 105 and the second source voltage 107—and, thus, isolation of the aircraft power buses in this example—may be maintained.

Transformer 102 may have a first bootstrap secondary winding 110 and a second bootstrap secondary winding 114. First bootstrap secondary winding 110 may supply a first bootstrap voltage 111 to a first control unit 112. First bootstrap voltage 111, labeled "PWM #1 Bootstrap", is shown in FIG. 1 at first bootstrap secondary winding 110 and at first control unit 112 although the actual interconnection from first bootstrap secondary winding 110 to first control unit 112 is not shown to avoid clutter in the figure. Similarly, a second bootstrap secondary winding 114 may supply a second bootstrap voltage 115 to a second control unit 116 as indicated in FIG. 1. Because the first primary common ground 117 is kept galvanically isolated from the second primary common ground 119, and both are kept galvanically isolated from the secondary common ground 121, galvanic isolation of the first source voltage 105 from the second source voltage 107—and the corresponding power buses—may be maintained.

First control unit 112 (also referred to as a pulse width modulator (PWM)) may pulse width modulate the current through primary winding 104 by controlling a switching element 122. For example, switching element 122 may be a solid-state switch—such as a MOSFET (metal oxide semiconductor field effect transistor) switch—and PWM 112 may pulse width modulate the primary winding 104 current provided from source voltage 105 by turning MOSFET switch 122 on and off. PWM 112 may make use, e.g., to determine the required duty cycle of the pulse width modulation, of a feedback signal 124 received from an error amplifier and optical isolator 126. Error amplifier and optical isolator 126 may receive a voltage 127, e.g., as determined by voltage divider 128, from the secondary winding 108. Because the voltage 127 from the secondary winding circuit may be isolated from the first primary winding circuit using error amplifier and optical isolator 126, galvanic isolation of the first source voltage 105 from the second source voltage 107 may be maintained.

Likewise, second control unit (PWM) 116, second error amplifier and optical isolator 130, and switching element 132 may provide a like functionality for the second primary winding circuit and maintain galvanic isolation of the first source voltage 105 from the second source voltage 107.

During normal operation of power supply system 100 it may be desired that first primary winding 104 should preferentially supply power to the secondary winding 108 and that second primary winding 106 should supply power only when power is not available from first primary winding 104.

For example, when first source voltage 105 is above a specified—e.g., pre-determined—low voltage drop out (LVDO) level, first PWM 112 may become active and at the same time may send an inhibit signal 133 to second PWM 116, disabling second PWM 116. In other words, inhibit signal 133 may be provided by first PWM 112 when it is operating normally so that second PWM 116 does not operate at the same time.

In the event that power is not available from the first primary winding 104—for example, first source voltage 105 either never gets above or drops below its LVDO voltage and second primary source voltage 107 is above its LVDO voltage—then first PWM 112 may either not begin or else cease operating and second PWM 116 may become active—in response, for example, to loss of the inhibit signal 133—so that power is transmitted to secondary winding 108 from second primary winding 106. During operation of second PWM 116, if first source voltage 105 gets above its LVDO voltage, first PWM 112 may become active and turn off second PWM 116 via the inhibit signal 133.

Thus, a preference for operation of the first primary winding 104 with operation of the second primary winding 106 serving as a back up may be implemented, referred to as master-slave operation. In this example, the first primary source voltage 105 serves as master and the second primary source voltage 107 serves as slave.

Inhibit signal 133 may be provided through a signal isolator 134, which may be, for example, an optical isolator. Because inhibit signal 133 passes from the first PWM 112 to the second PWM 116 through signal isolator 134, galvanic isolation of the first source voltage 105 from the second source voltage 107 may be maintained.

System 100 may also contain various elements that may be familiar to one of ordinary skill in the art, such as rectifier diodes 142 and filter capacitors 144. Similarly, logic (not shown) for sensing voltage below the LVDO and performing appropriate modification to the inhibit signal 133 may also be provided.

Figure 2:
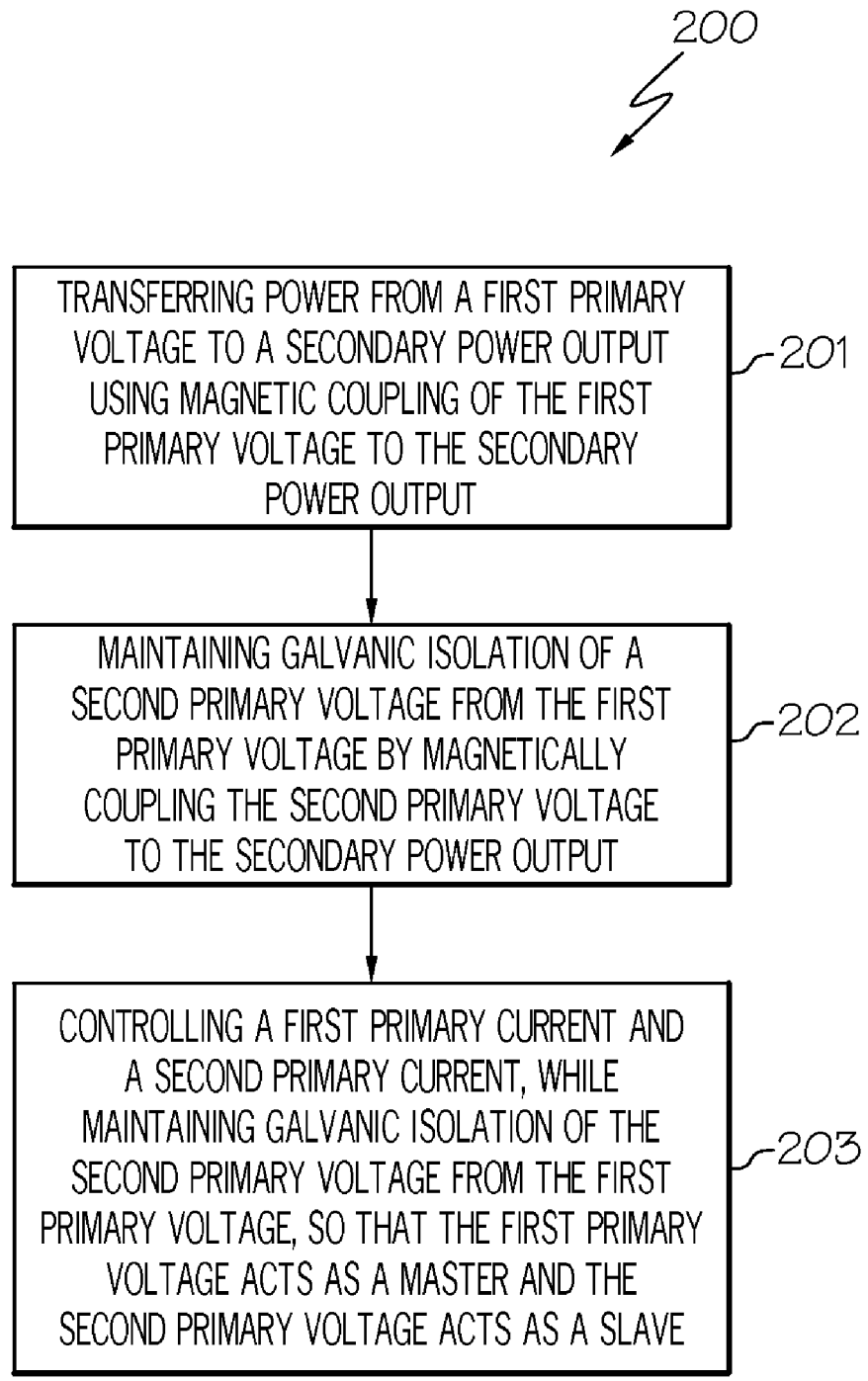
FIG. 2 is a flowchart for a method of providing electrical power output from galvanically isolated power inputs in accordance with one embodiment of the present invention.

FIG. 2 illustrates a method 200 for providing electrical power output from galvanically isolated power inputs in accordance with one embodiment. At step 201, method 200 may transfer power from a first primary voltage, e.g., first source voltage 105, to a secondary power output, e.g., output voltage 109, using magnetic coupling, e.g., via transformer 102, of the first primary voltage to the secondary power output.

At step 202, method 200 may maintain galvanic isolation of a second primary voltage, e.g., second source voltage 107, from the first primary voltage by magnetically coupling, e.g., via transformer 102, the second primary voltage to the secondary power output.

At step 203, method 200 may control, e.g., using a first control unit (or PWM) 112 and a second control unit (or PWM) 116, respectively, a first primary current and a second primary current, while maintaining galvanic isolation, e.g., using optical isolators 126, 130, of the second primary voltage from the first primary voltage, so that the first primary voltage acts as a master and the second primary voltage acts as a slave, e.g., using inhibit signal 133 and signal isolator 134.

It should be understood, of course, that the foregoing relates to exemplary embodiments of the invention and that modifications may be made without departing from the spirit and scope of the invention as set forth in the following claims.

We claim:

1. An electric power supply system comprising:
a transformer having first and second primary windings for receiving input power and a secondary winding for delivering output power;
a first switching element connected to the first primary winding so as to control current in the first primary winding;
a second switching element connected to the second primary winding so as to control current in the second primary winding;
a first control unit connected to the first switching element;
a second control unit connected to the second switching element, wherein:
the first primary winding, the first switching element, and the first control unit are galvanically isolated from the second primary winding, the second switching element, and the second control unit;
a first primary common ground coupled to the first primary winding;
a second primary common ground coupled to the second primary winding; and
a secondary common ground coupled to the secondary winding, wherein
the first primary common ground, the second primary common ground and the secondary common ground are galvanically isolated from each other.

2. The system of claim 1, wherein:
the two primary windings are configured to function as a master and a slave.

3. The system of claim 1, further comprising:
an isolator that provides an inhibit signal from a master one of the first and second control units to a slave one of the first and second control units, wherein:
the isolator maintains galvanic isolation of the master control unit from the slave control unit; and
operation of the master control unit inhibits operation of the slave control unit.

4. The system of claim 1, further comprising:
a first signal isolator that provides a feedback signal from the secondary winding to the first control unit and maintains galvanic isolation of the first control unit from the second control unit.

5. The system of claim 1, further comprising:
a second signal isolator that provides a feedback signal from the secondary winding to the second control unit and maintains galvanic isolation of the first control unit from the second control unit.

6. An apparatus for supplying electrical power comprising:
a first common ground;
a second common ground galvanically isolated from the first common ground;
a transformer having at least two primary windings and a secondary winding, a first of the at least two primary windings being coupled to the first common ground and to a first DC voltage source galvanically isolated from the second common ground, and a second of the at least two primary windings being coupled to the second common ground and to a second DC voltage source, galvanically isolated from the first common ground;
a first pulse width modulator that controls current through the first primary winding;
a second pulse width modulator that controls current through the second primary winding.

7. The apparatus of claim 6, wherein:
the first and second primary windings are wound bifilar.

8. The apparatus of claim 6, further comprising:
an optical isolator that passes an inhibit signal from the first pulse width modulator to the second pulse width modulator during operation of the first pulse width modulator and maintains galvanic isolation between the first DC voltage source and the second DC voltage source.

9. The apparatus of claim 8, wherein:
the inhibit signal stops when a first DC voltage falls below a pre-determined low voltage drop out (LVDO) voltage; and
operation switches over to the second pulse width modulator in response to loss of the inhibit signal.

10. The apparatus of claim 6, further comprising:
a voltage divider that is connected to the secondary winding of the transformer;
a first error amplifier that is connected to the voltage divider, receives a portion of the secondary winding voltage, and provides a first feedback signal to the first pulse width modulator that is optically isolated from the first pulse width modulator;
a second error amplifier that is connected to the voltage divider, receives the portion of the secondary winding voltage, and provides a second feedback signal to the second pulse width modulator that is optically isolated from the second pulse width modulator; and wherein:
galvanic isolation is maintained between the first DC voltage source and the second DC voltage source.

11. The apparatus of claim 6, wherein:
the secondary winding provides power to a load from either the first DC voltage source or the second DC voltage source.

12. The apparatus of claim 6, further comprising:
a first bootstrap secondary winding of the transformer that provides a first bootstrap voltage to the first pulse width modulator and wherein galvanic isolation is maintained between the first DC voltage source and the second DC voltage source.

13. The apparatus of claim 6, further comprising:
a first switching element connected in series with the first primary winding so as to control current in the first primary winding, wherein:
the first switching element is a solid state device controlled by the first pulse width modulator so as to switch the first switching element on and off.

14. A method for supplying electrical power to a load, comprising:
supplying first DC power from a first power bus;
supplying second DC power from a second power bus, the second power bus being galvanically isolated from the first power bus;
magnetically coupling the first power to a secondary power output;

switching current through a first primary winding of a transformer on and off by pulse width modulating the current according to a galvanically isolated feedback signal from a secondary winding of the transformer, wherein the secondary winding supplies power to the load; and magnetically coupling the second power to the secondary power output.

15. The method of claim 14, further comprising:

providing a bootstrap voltage from a first bootstrap secondary winding of the transformer for pulse width modulating the current.

16. The method of claim 14, wherein:

the switching is solid-state switching.

* * * * *